United States Patent
Kljajic et al.

(10) Patent No.: US 6,970,525 B1
(45) Date of Patent: Nov. 29, 2005

(54) HIGH-SPEED, HIGH GRANULARITY BAUD CLOCK GENERATION

(75) Inventors: Vladimir Kljajic, Schaumburg, IL (US); Jay Cantrell, Naperville, IL (US)

(73) Assignee: Texas Instruments Incorporated, Dallas, TX (US)

( * ) Notice: Subject to any disclaimer, the term of this patent is extended or adjusted under 35 U.S.C. 154(b) by 908 days.

(21) Appl. No.: 09/639,432

(22) Filed: Aug. 14, 2000

(51) Int. Cl.[7] ................................................ H04B 1/10
(52) U.S. Cl. ................. 375/354; 375/219; 375/220; 708/504; 708/650; 327/291
(58) Field of Search ................. 375/354, 377, 375/225, 219, 220; 710/29, 100, 105, 106; 708/504, 650; 327/291

(56) References Cited

U.S. PATENT DOCUMENTS

| 6,163,586 A | * | 12/2000 | Hongbin Hao et al. ...... 375/377 |
| 6,366,610 B1 | * | 4/2002 | Loyer et al. ................ 375/225 |

* cited by examiner

*Primary Examiner*—Jay K. Patel
*Assistant Examiner*—Guillermo Munoz
(74) *Attorney, Agent, or Firm*—W. Daniel Swayze, Jr.; W. James Brady; Frederick J. Telecky, Jr.

(57) ABSTRACT

A baud clock (15) for use by a serial communication interface (67) is generated by dividing a base clock of the serial communication interface by one of a plurality of possible composite divisors ($D_{EG}$). Each composite divisor is indicative of a minimum time interval by which adjacent pulses of the baud clock are to be separated, and further indicates that at least one pair of adjacent pulses within each symbol interval of the baud clock are to be separated by an extended time interval which is longer than the minimum time interval.

28 Claims, 4 Drawing Sheets

REMD
0 → 0 0 0 0 0 0 0 0 0 0 0 0 0 0 0 0
1 → 0 0 0 1 0 0 0 0 0 0 0 0 0 0 0 0
2 → 0 0 0 1 0 0 0 0 0 0 0 1 0 0 0 0
3 → 0 1 0 1 0 0 0 0 0 0 0 1 0 0 0 0
4 → 0 1 0 1 0 0 0 0 0 0 0 1 0 1 0 0
5 → 0 1 0 1 0 1 0 0 0 0 0 1 0 1 0 0
6 → 0 1 0 1 0 1 0 0 0 0 0 1 0 1 0 1
7 → 0 1 0 1 0 1 0 1 0 0 0 1 0 1 0 1
8 → 0 1 0 1 0 1 0 1 0 1 0 1 0 1 0 1
9 → 0 1 0 1 0 1 1 1 0 1 0 1 0 1 0 1
10 → 0 1 0 1 0 1 1 1 0 1 0 1 0 1 1 1
11 → 0 1 1 1 0 1 1 1 0 1 0 1 0 1 1 1
12 → 0 1 1 1 0 1 1 1 0 1 1 1 0 1 1 1
13 → 0 1 1 1 1 1 1 1 0 1 1 1 0 1 1 1
14 → 0 1 1 1 1 1 1 1 1 1 1 1 0 1 1 1
15 → 1 1 1 1 1 1 1 1 1 1 1 1 0 1 1 1
FIG. 4
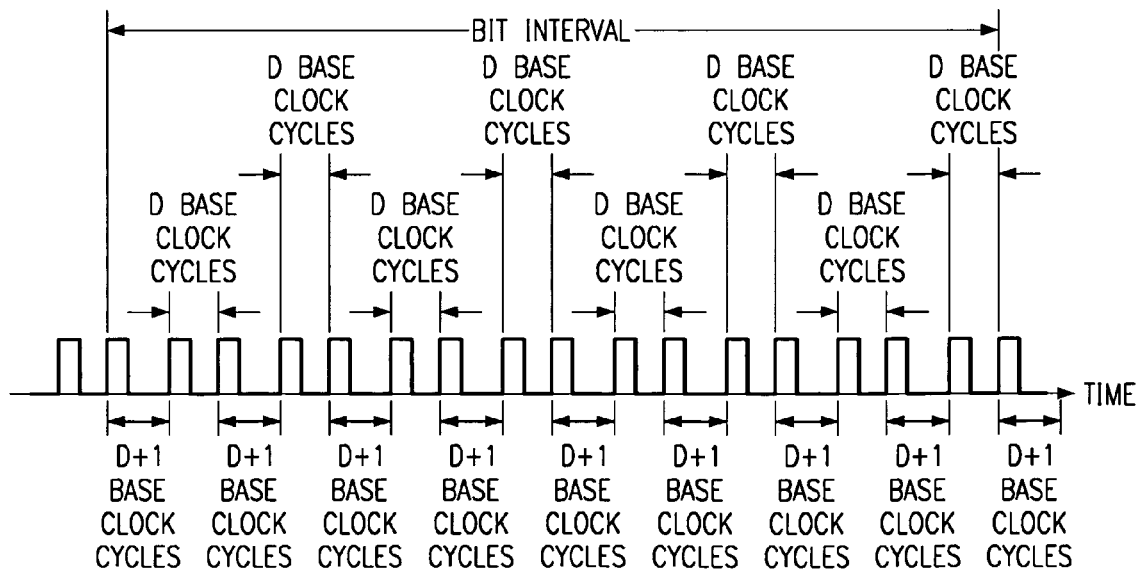
FIG. 6
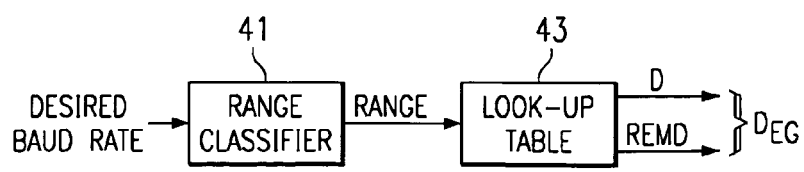
FIG. 7

| BAUD RATE RANGES | D | REMD |
|---|---|---|
| RANGE 1 | 1 | 0 |
| RANGE 2 | 1 | 1 |
| RANGE 3 | 1 | 2 |
| ⋮ | ⋮ | ⋮ |
| RANGE K | 1 | K−1 |
| RANGE K+1 | 2 | 0 |
| RANGE K+2 | 2 | 1 |
| RANGE K+3 | 2 | 2 |
| ⋮ | ⋮ | ⋮ |
| RANGE 2K | 2 | K−1 |
| RANGE 2K+1 | 3 | 0 |
| RANGE 2K+2 | 3 | 1 |
| RANGE 2K+3 | 3 | 2 |
| ⋮ | ⋮ | ⋮ |
*FIG. 8*
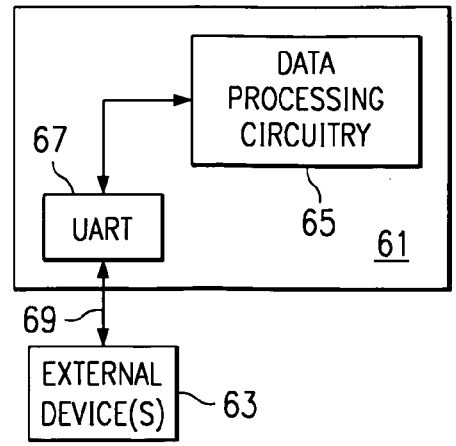
*FIG. 9*
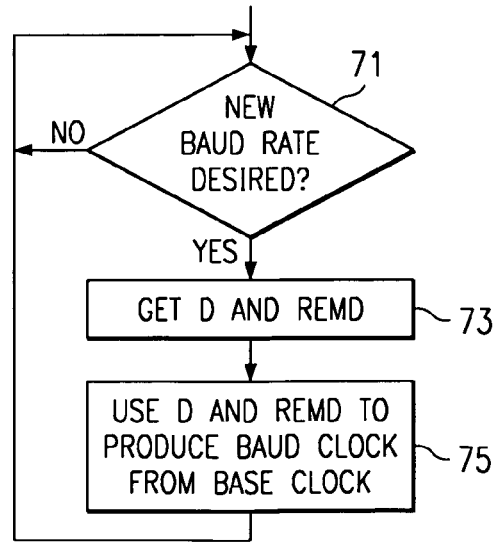
*FIG. 10*
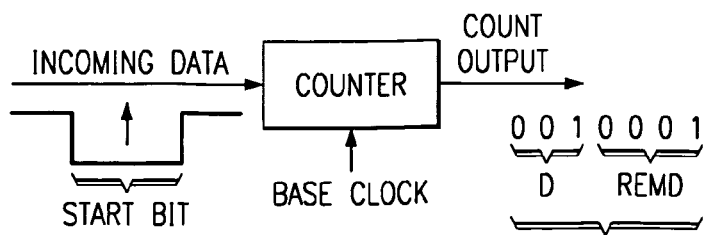
*FIG. 11*

HIGH-SPEED, HIGH GRANULARITY BAUD CLOCK GENERATION

FIELD OF THE INVENTION

The invention relates generally to baud clock generation and baud rate detection for serial communications and, more particularly, to baud clock generation and baud rate detection for serial communication interfaces that use oversampling and a fixed frequency clock.

BACKGROUND OF THE INVENTION

In conventional serial communication interfaces that use oversampling during data reception (also referred to herein as oversampling serial communication interfaces), for example universal asynchronous receiver/transmitters (UARTs), the baud rate is typically obtained by dividing the base clock rate of the interface by a number that is an integer multiple of the oversampling factor. Thus, the possible baud rates are given by: base clock frequency/((oversampling factor)×(integer divisor)), where the oversampling factor is expressed, for example, in baud clock pulses (i.e., samples) per bit. If the base clock of the serial communication interface is set at a fixed frequency, as is typical, then there are significant gaps between the possible baud rates. For example, for a base clock frequency of 1.8432 MHZ and an oversampling factor of 16 pulses/bit, the baud clock rates produced by using integer divisors of 1,2 and 3 are 115,200 baud (bits/second in this example), 57,600 baud and 38,400 baud, respectively. Note the significant gap between the adjacent baud rates of 115,200 and 57,600. In this situation, if there is a need for a baud rate that does not fall near any of the available baud rates, for example 76,800, it is typically necessary to provide a higher base clock frequency, from which an acceptable approximation of the desired baud rate can be derived. However, the increased base clock frequency disadvantageously requires an increase in the power used by the serial communication interface.

It is therefore desirable to increase the number of available baud rates without increasing the base clock frequency of the serial communication interface.

The present invention provides for generation of a baud clock by dividing the base clock of the serial communication interface by one of a plurality of possible composite divisors. Each composite divisor is indicative of a minimum time interval between adjacent pulses of the associated baud clock, and further indicates that at least one pair of adjacent pulses within each symbol interval of the associated baud clock are to be separated by an extended time interval which is longer than the minimum time interval. The composite divisor advantageously results in a large number of available baud clock rates without increasing the base clock frequency.

BRIEF DESCRIPTION OF THE DRAWINGS

FIG. 4 illustrates exemplary contents of the pulse pattern memory of FIG. 3.

FIG. 6 is a timing diagram which illustrates an example of a baud clock signal generated by the clock divider of FIG. 3.

FIG. 7 diagrammatically illustrates another exemplary embodiment of the divisor generator of FIG. 1.

FIG. 8 illustrates a portion of the contents of an exemplary embodiment of the look-up table of FIG. 7.

FIG. 9 diagrammatically illustrates pertinent portions of an exemplary embodiment of a data processing and communication system according to the invention.

FIG. 10 illustrates exemplary operations which can be performed by the embodiments of FIGS. 1–9.

FIG. 11 illustrates an exemplary embodiment of a baud rate detector according to the invention.

DETAILED DESCRIPTION

Figure 1:
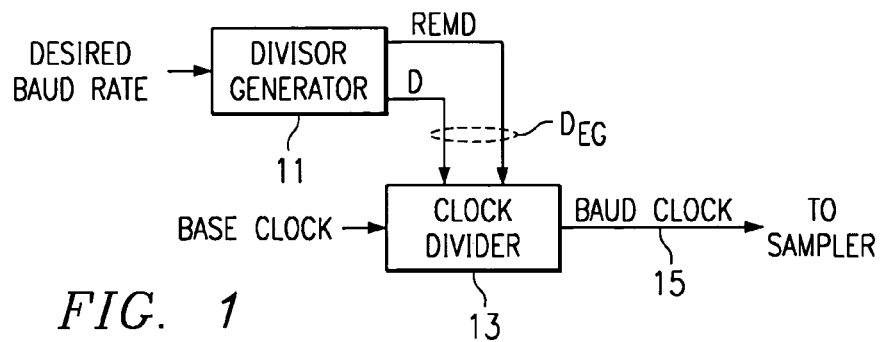
FIG. 1 diagrammatically illustrates an exemplary embodiment of a baud clock generator according to the present invention.

FIG. 1 diagrammatically illustrates an exemplary embodiment of a baud clock generator according to the invention. The baud clock generator can be provided, for example, in an oversampling serial communication interface such as a UART. In FIG. 1, information indicative of the desired baud rate, for example in units of bits/second, is input to a divisor generator 11. In response to the desired baud rate, the divisor generator 11 produces and outputs an enhanced granularity divisor DEG. This enhanced granularity divisor is a composite divisor including a first divisor component D and a second divisor component REMD. These divisor components are input to a clock divider 13 which, in response to the first and second divisor components, divides the base clock signal of the oversampling serial communication interface to produce a baud clock signal that approximates the desired baud rate. The baud clock signal 15 is provided to a sampler of the oversampling serial communication interface, which can use the baud clock signal in conventional fashion to sample serial communication data received at the interface. The baud clock signal 15 can also be used in conventional fashion to transmit data from the interface.

The first divisor component D corresponds to the aforementioned integer divisor that is conventionally used to generate baud rates. Using the conventional technique, the integer divisor that will produce the closest approximation to a desired baud rate is given by the quotient of the following division operation: base clock frequency/(K×desired baud rate), where K is the oversampling factor associated with the oversampling serial communication interface. Advantageously, the invention utilizes also the modulo K remainder produced by this division operation. By using the modulo K remainder, the invention produces K-1 intermediate baud rates between any given pair of adjacent baud rates that would be produced by the conventional technique. The second divisor component REMD of FIG. 1 corresponds to this modulo K remainder.

Figure 2:
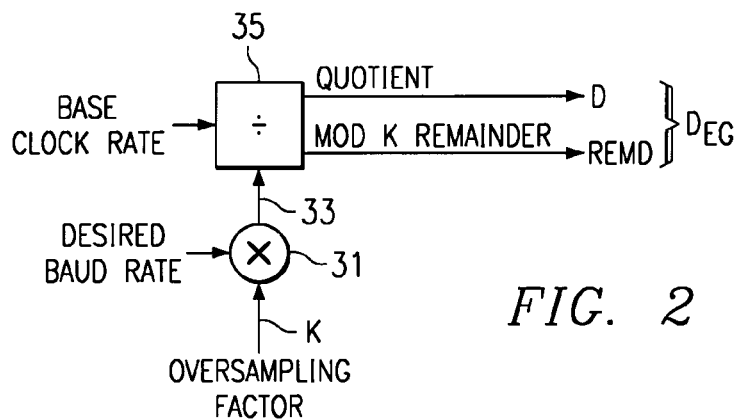
FIG. 2 diagrammatically illustrates an exemplary embodiment of the divisor generator of FIG. 1.

FIG. 2 diagrammatically illustrates an exemplary embodiment of the divisor generator of FIG. 1. In the embodiment of FIG. 2, a multiplier 31 multiplies the desired baud rate by the oversampling factor K. A divider 35 divides the base clock rate of the serial communication interface by the output 33 of the multiplier 31, namely K×(desired baud rate), producing a quotient and a modulo K remainder. The modulo K remainder is the second divisor component REMD of FIG. 1, and the quotient is the first divisor component D of FIG. 1.

Figure 3:
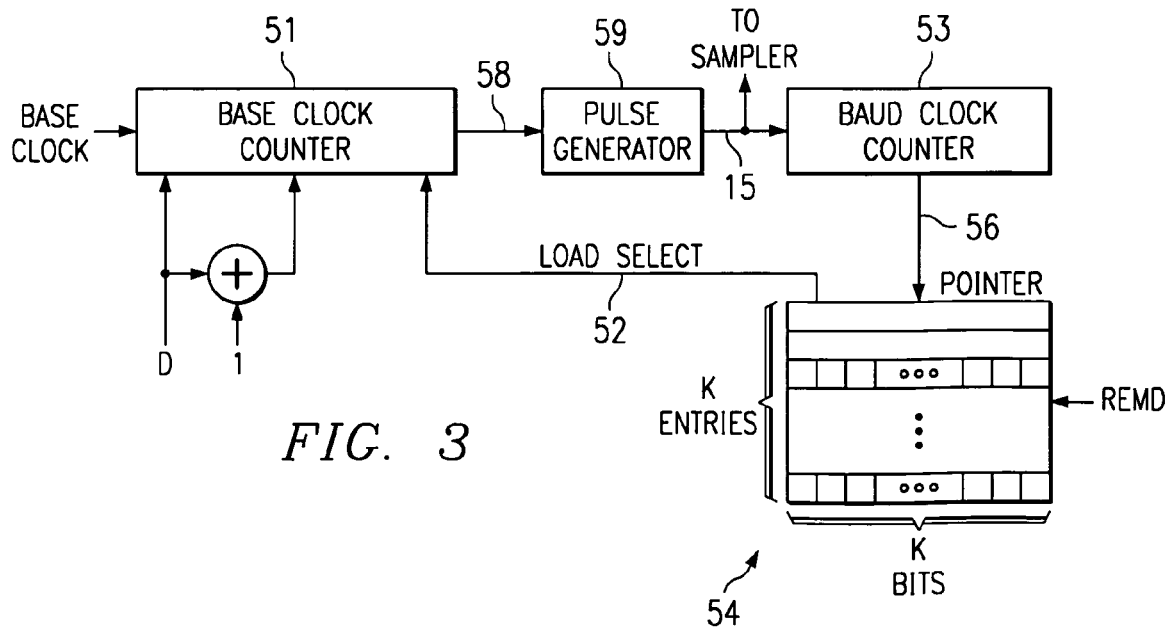
FIG. 3 diagrammatically illustrates an exemplary embodiment of the clock divider of FIG. 1.

FIG. 3 diagrammatically illustrates an exemplary embodiment of the clock divider 13 of FIG. 1. In this embodiment, the base clock of the serial communication interface is applied to the count input of a base clock counter 51 which counts pulses of the base clock. After a predetermined number of base clock pulses, the output 58 of counter 51 triggers a pulse generator 52 to output a baud clock pulse. The counter 51 includes a load select input 52 that determines which of two possible target count values will be loaded into the counter 51. More specifically, the counter 51 is selectively loaded with a target count value of D or D+1 in response to input 52. Thus, when D is selected as the target count value, the counter 51 triggers a baud clock pulse for every D pulses of the base clock. Similarly, when D+1 is selected as the target count value, the counter 51 triggers a baud clock pulse for every D+1 pulses of the base clock.

The load select input 52 is driven from a pulse pattern memory 54 that includes K entries, one for each possible value of the modulo K remainder REMD. Each of the K entries in the pulse pattern memory 54 includes K bits having a value of either 1 or 0. The second divisor component REMD is input to the pulse pattern memory 54, and selects the corresponding one of the K entries. The pulse pattern memory 54 has a pointer input 56 which points to one of the K bits of the entry selected by REMD. The pointer value at 56 is provided by a baud clock counter 53 whose count input is coupled to the baud clock 15. The counter 53 counts cyclically through K states, thereby repeatedly tracking the K baud clock pulses used to sample each bit received at the serial communication interface. The output count value of counter 53 is provided as the pointer value at 56. Thus, for each baud clock pulse within a given bit interval of the serial communication interface, the pointer 56 points to a specific one of the K bit locations in the pulse pattern memory entry selected by REMD. If the bit value pointed to is 0, then the pulse pattern memory 54 outputs a load select value of 0, thereby selecting D to be loaded as the count target for counter 51. If the bit value pointed to is 1, then the pulse pattern memory 54 outputs a load select value of 1, thereby selecting D+1 to be loaded as the count target for counter 51.

FIG. 4 illustrates exemplary contents of the pulse pattern memory 54 of FIG. 3. In this example, the oversampling factor K is 16, so there are 16 entries in the pulse position memory, each entry having 16 bits. For this oversampling factor of K=16, and recalling that REMD is a modulo K remainder, there are 16 possible values of REMD, namely 0–15. As shown in FIG. 4, the entry corresponding to REMD=0 includes all 0s. In this instance, all pulses of the baud clock will be separated from one another by a time interval corresponding to D pulses of the base clock, just as in the prior art.

As shown by the example of FIGS. 3 and 4, a non-zero value of REMD specifies a number of pairs of adjacent pulses within each bit interval of the baud clock 15 will be separated by a time interval corresponding to D+1 pulses of the base clock. That is, for example, when REMD=1, the corresponding entry in the pulse position memory has one bit with a value of 1, so there will be a time interval corresponding to D+1 base clock pulses between 1 pair of adjacent pulses in each bit interval of the baud clock. This time interval corresponding to D+1 base clock pulses is longer than the aforementioned time interval associated with D base clock pulses and, in this example, will occur between the third and fourth baud clock pulses of each bit interval, because the fourth bit in the pulse pattern memory entry corresponding to REMD=1 has a value of 1. Similarly, for a value of REMD=2, two pairs of adjacent baud clock pulses in each bit interval will be separated by the longer (D+1) time interval, namely the third and fourth pulses and the eleventh and twelfth pulses. As can be seen in the example of FIG. 4, it can be advantageous to distribute the 1 s approximately evenly within the respective pulse position memory entries, thus approximately evenly distributing the longer time intervals throughout the bit interval.

Figure 5:
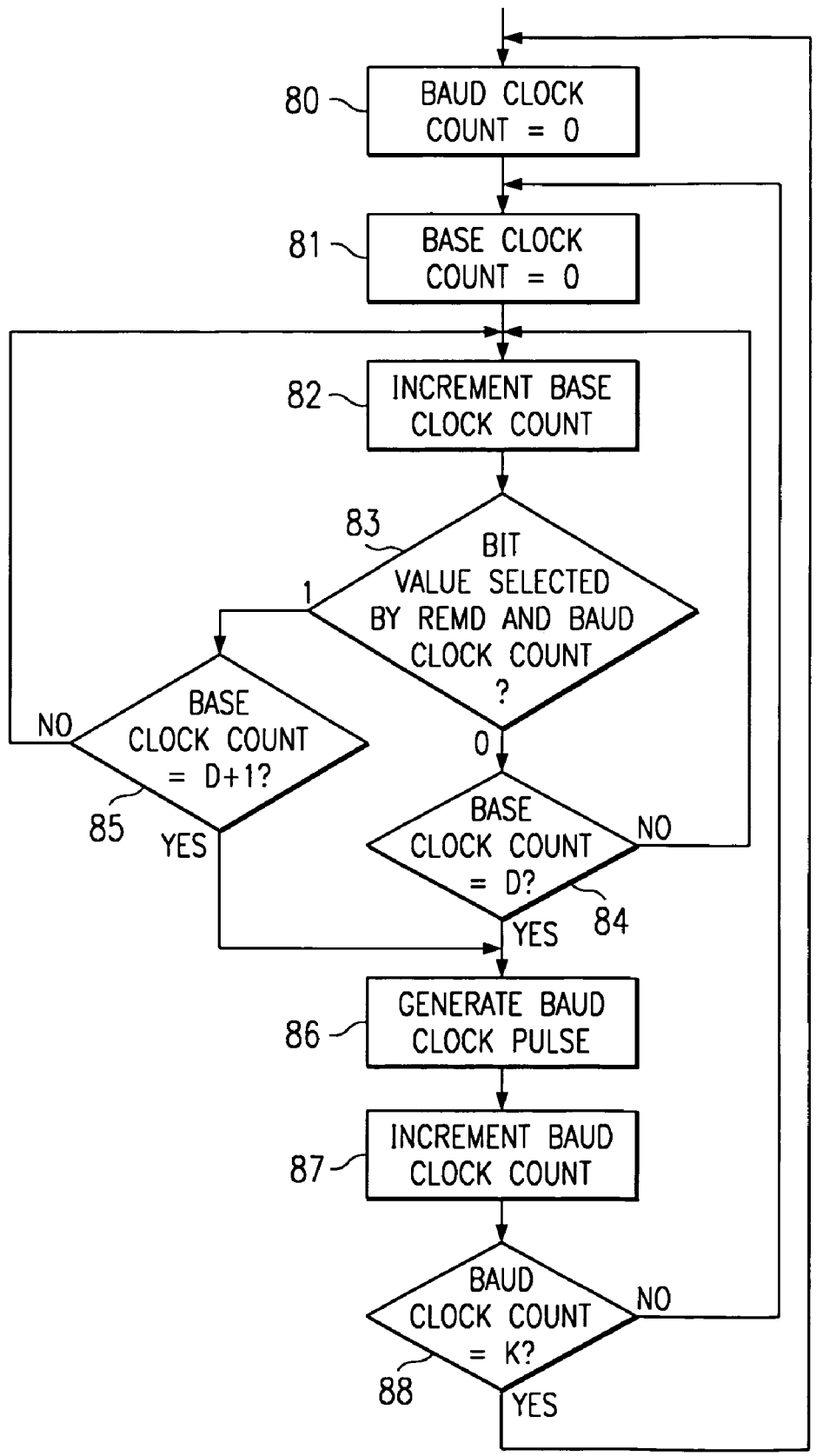
FIG. 5 illustrates exemplary operations which can be performed by the clock divider embodiment of FIG. 3.

FIG. 5 illustrates exemplary operations which can be performed by the clock divisor of embodiment of FIG. 3. After initializing base clock and baud clock count values at 80 and 81, respectively, the first base clock pulse is received at 82, causing the base clock count to increment by one. It is thereafter determined at 83 whether the pulse pattern memory bit selected by REMD and the baud clock count value is 1 or 0. If the selected bit is 0, then D base clock pulses will be counted, as illustrated at 84. If the selected bit is 1, then D+1 base clock pulses will be counted, as illustrated at 85. After the selected number (D or D+1) of base clock pulses have been counted at 84 or 85, a baud clock pulse is generated at 86. The baud clock pulse at 86 causes the baud clock count value to increment by one as shown at 87. The aforementioned steps at 81–87 are then repeated until the end of the current bit interval is reached at 88, namely when the baud clock count value reaches K. At this point, the count values are reset again at 80 and 81.

FIG. 6 is a timing diagram which illustrates an example of the baud clock 15 produced by the clock divider embodiment of FIG. 3. In the example of FIG. 6, the oversampling factor K is 16 and REMD=8. The value of D sets the minimum time interval (D base clock cycles) between the leading edges of any two adjacent baud clock pulses, and the value of D+1 defines an extended time interval (D+1 base clock cycles) between selected pairs of adjacent baud clock pulses. In the FIG. 6 example, the alternating sequence of minimum time intervals associated with count value D and extended time intervals associated with count value D+1 conforms to the alternating sequence of 0s and 1s in the FIG. 4 pulse position memory entry corresponding to REMD=8. In the example of FIG. 6, the overall length of each bit interval is 8×D+8(D+1)=16D+8 base clock cycles. If D=3, for example, the bit interval length is 56 base clock cycles. This corresponds exactly to the baud rate given by: base clock rate/(K×D+REMD), for K=16, D=3 and REMD=8 which is: base clock rate/56. Although the example of FIG. 6 shows 16 baud clock pulses per bit interval, it will be clear to workers in the art that the invention is more generally applicable to any baud clock having K pulses per symbol interval.

Returning now to the aforementioned example of a desired baud rate of 76,800, an oversampling factor of K=16 and a base clock rate of 1.8432 MHZ, the embodiment of FIG. 2 yields D=1 and REMD=8. These values of D and REMD will yield a baud rate of: $1.8432 \times 10^6/16(1)+8=76,800$. As another example, for a desired baud rate of 82,000, an oversampling factor of K=16 and a base clock rate of 1.8432 MHZ, the embodiment of FIG. 2 yields D=1 and REMD=6. Thus, the resultant baud rate will be: $1.8432 \times 10^6/16(1)+6=83,781.8$. This baud rate approximates the desired 82,000 rate significantly more closely than do the two closest possibilities yielded by the aforementioned prior art technique, namely 115,200 or 57,600.

FIG. 7 illustrates another exemplary embodiment of the divisor generator of FIG. 1. The embodiment of FIG. 7 utilizes a look-up table 43 to produce the first and second divisor components D and REMD. As illustrated in more detail in FIG. 8, the look-up table at 43 can index the possible pairs of values of D and REMD against respective baud rate ranges. For a given oversampling factor of K, there are K possible values of REMD (0 through K-1) for each possible value of D, because REMD is a modulo K remainder. Again using the example of a 1.8432 MHZ base clock rate and an oversampling factor of K=16: if D=1 and REMD=0, then the baud rate is 115,200; if D=1 and REMD=1, then the baud rate will be 108,423.5; and if D=1 and REMD=2, then the baud rate will be 102,400. Thus, for example, Range 2 in the look-up table of FIG. 8 could extend from a value halfway between 115,200 and 108,423.5 to a value halfway between 108,423.5 and 102,400. If the desired baud rate falls within Range 2, then the baud rate provided by the baud clock of FIG. 1 will be 108,423.5, namely the baud rate associated with D=1 and REMD=1. The embodiment of FIG. 7 includes a range classifier 41 which receives the desired baud rate and determines which of the ranges, Range 1, Range 2, etc. contains the desired baud rate. The range determined by the range classifier 41 is then input to the look-table 43, and corresponding values of the first and second divisor components D and REMD are output from the look-table.

It can be seen from FIGS. 1–8 that the composite nature of the enhanced granularity divisor DEG advantageously results in K-1 intermediate baud rates available between each pair of adjacent baud rates produced using the conventional technique. For example, with a base clock frequency of 1.8432 MHZ and an oversampling factor of K=16, there are 15 intermediate baud rates (corresponding to REMD=1–15) available between 115,200 (D=1 and REMD=0) and 57,600 (D=2 and REMD=0).

FIG. 9 diagrammatically illustrates pertinent portions of an exemplary data processing and communication system according to the present invention. In FIG. 9, a data processing apparatus 61 is coupled at 69 for serial communication with one or more external devices shown generally at 63. The data processing apparatus 61 includes data processing circuitry 65 and a serial communication interface 67 coupled to the data processing circuitry 65 for permitting serial communication between the data processing circuitry 65 and the external device(s) 63. In the exemplary embodiment illustrated in FIG. 9, the serial communication interface 67 is a UART including the baud clock generator of FIG. 1. The data processing circuitry 65 can perform any desired data processing operation(s) on data communicated between the data processing apparatus 61 and the external device(s) 63.

In one example, the data processing apparatus 61 is a microprocessor or digital signal processor, and the external device(s) at 63 can be any external device with which microprocessors and digital signal processors can communicate via the serial communication path shown diagrammatically at 69. For example, the external device(s) at 63 could be some other microprocessor(s) or digital signal processor(s). In some exemplary embodiments, the serial communication path at 69 is an RS-232 link.

In another example, the data processing apparatus 61 is the central processing unit (CPU) of a desktop or laptop computer, and the external device(s) at 63 is a keyboard, mouse, printer or any device that provides a man-machine interface to the central processing unit. In a further example, the data processing apparatus 61 and the external device(s) at 63 are modems coupled via serial interface(s) to permit communication between further devices that are not explicitly shown in FIG. 9. In a still further example, the data processing apparatus 61 is a radiotelephone and the external device 63 is a laptop or desktop computer.

FIG. 10 illustrates exemplary operations which can be performed by the embodiments of FIGS. 1–9. It is first determined at 71 whether a new baud rate is desired. If so, then D and REMD are obtained at 73. Thereafter D and REMD are used at 75 to produce the baud clock from the base clock.

FIG. 11 diagrammatically illustrates an example of a baud rate detector with which an external device such as shown at 63 in FIG. 9 can determine what baud rate is being used by the communication interface 67 of FIG. 9. In the example of FIG. 11, a counter counts the number of base clock cycles that occur during the START bit conventionally associated with the incoming data. Assuming in this example an oversampling factor K=16, the 4 ($2^4$=16) least significant bits of the output count value will represent REMD (REMD=1 in this example) and the remaining most significant bits represent D (D=1 in this example). These D and REMD values can then be applied to the clock divider 13 of FIGS. 1 and 3, which can then produce the baud clock needed to sample the incoming data. Thus, the baud rate detector of FIG. 11 is another example of a divisor generator for use with the clock divider 13.

It should be evident from the foregoing that use of the enhanced granularity divisor including first and second divisor components according to the present inventions provides a significantly larger number of available baud rates given a fixed base clock frequency. This permits the desired baud rate to be approximated much more closely than in the prior art, particularly at relatively high baud rates. This closer approximation can advantageously be provided without requiring an increase in the base clock frequency.

Although exemplary embodiments of the invention are described above in detail, this does not limit the scope of the invention, which can be practiced in a variety of embodiments.

What is claimed is:

1. A method of generating from a base clock signal having a predetermined frequency a baud clock signal for use in serial communications, comprising: selecting a desired baud rate;

in response to the desired baud rate, providing a composite divisor which is indicative of a minimum time interval by which leading edges of adjacent pulses of the baud clock signal are to be separated and which further indicates that leading edges of at least one pair of adjacent pulses within each symbol interval of the baud clock signal are to be separated by an extended time interval which is longer than said minimum time interval; and dividing the base clock signal in response to said composite divisor to produce a quotient and remainder and to produce a baud clock signal which has a baud rate that approximates the desired baud rate and which has within each symbol interval thereof at least the minimum time interval based on a first divisor component corresponding to said quotient between the leading edges of all adjacent pulses thereof and the extended time interval based to a second divisor component corresponding to said remainder between the leading edges of at least one pair of adjacent pulses thereof.

2. The method of claim 1, including providing an oversampling factor indicative of a number of baud clock pulses within each symbol interval of the baud clock signal, said step of providing a composite divisor including providing the composite divisor in response to the oversampling factor and the desired baud rate.

3. The method of claim 1, wherein the composite divisor includes a first divisor component indicative of the minimum time interval and a second divisor component which indicates that the leading edges of at least one pair of adjacent pulses are to be separated by the extended time interval.

4. A method of generating from a base clock signal having a predetermined frequency a baud clock signal for use in serial communications, comprising: selecting a desired baud rate;
   in response to the desired baud rate, providing a composite divisor which is indicative of a minimum time interval by which leading edges of adjacent pulses of the baud clock signal are to be separated and which further indicates that leading edges of at least one pair of adjacent pulses within each symbol interval of the baud clock signal are to be separated by an extended time interval which is longer than said minimum time interval; and
   dividing the base clock signal in response to said composite divisor to produce a baud clock signal which has a baud rate that approximates the desired baud rate and which has within each symbol interval thereof at least the minimum time interval between the leading edges of all adjacent pulses thereof and the extended time interval between the leading edges of at least one pair of adjacent pulses thereof,
   wherein the composite divisor includes a first divisor component indicative of the minimum time interval and a second divisor component which indicates that the leading edges of at least one pair of adjacent pulses are to be separated by the extended time interval; and
   wherein said step of providing a composite divisor includes dividing the predetermined frequency of the base clock signal by the desired baud rate and by the oversampling factor to produce a quotient and a remainder, providing the quotient as the first divisor component, and providing the remainder as the second divisor component.

5. The method of claim 4, wherein the remainder is modulo K, and K is the oversampling factor.

6. A method of generating from a base clock signal having a predetermined frequency a baud clock signal for use in serial communications, comprising: selecting a desired baud rate;
   in response to the desired baud rate, providing a composite divisor which is indicative of a minimum time interval by which leading edges of adjacent pulses of the baud clock signal are to be separated and which further indicates that leading edges of at least one pair of adjacent pulses within each symbol interval of the baud clock signal are to be separated by an extended time interval which is longer than said minimum time interval; and
   dividing the base clock signal in response to said composite divisor to produce a baud clock signal which has a baud rate that approximates the desired baud rate and which has within each symbol interval thereof at least the minimum time interval between the leading edges of all adjacent pulses thereof and the extended time interval between the leading edges of at least one pair of adjacent pulses thereof,
   wherein the composite divisor includes a first divisor component indicative of the minimum time interval and a second divisor component which indicates that the leading edges of at least one pair of adjacent pulses are to be separated by the extended time interval; and
   wherein said step of providing a composite divisor includes providing a plurality of possible values of the first divisor component and providing for each of the possible values of the first divisor component a plurality of possible values of the second divisor component.

7. The method of claim 6, including providing an oversampling factor indicative of a number of baud clock pulses within each symbol interval of the baud clock signal, and producing the possible values of the second divisor component based on the oversampling factor.

8. A method of generating from a base clock signal having a predetermined frequency a baud clock signal for use in serial communications, comprising: selecting a desired baud rate;
   in response to the desired baud rate, providing a composite divisor which is indicative of a minimum time interval by which leading edges of adjacent pulses of the baud clock signal are to be separated and which further indicates that leading edges of at least one pair of adjacent pulses within each symbol interval of the baud clock signal are to be separated by an extended time interval which is longer than said minimum time interval; and
   dividing the base clock signal in response to said composite divisor to produce a baud clock signal which has a baud rate that approximates the desired baud rate and which has within each symbol interval thereof at least the minimum time interval between the leading edges of all adjacent pulses thereof and the extended time interval between the leading edges of at least one pair of adjacent pulses thereof,
   wherein the composite divisor includes a first divisor component indicative of the minimum time interval and a second divisor component which indicates that the leading edges of at least one pair of adjacent pulses are to be separated by the extended time interval; and
   wherein said dividing step includes determining the minimum time interval and the extended time interval in response to the first divisor component and the predetermined frequency of the base clock signal, and selecting the at least one pair of adjacent pulses in response to the second divisor component.

9. The method of claim 8, wherein said selecting step includes selecting in response to the second divisor component a plurality of pairs of adjacent pulses within each symbol interval of the baud clock signal whose respective pairs of leading edges are to be separated by the extended time interval.

10. An apparatus for generating a baud clock signal for use in a serial communication interface, comprising:
   a first input for receiving a base clock signal having a predetermined frequency;
   a second input for receiving information indicative of a desired baud rate;
   a divisor generator coupled to said second input for providing in response to the desired baud rate a composite divisor to produce a quotient and remainder which is indicative of a minimum time interval based on a first divisor component corresponding to said quotient by which leading edges of adjacent pulses of the baud clock signal are to be separated and which further indicates that leading edges of at least one pair of adjacent pulses within each symbol interval of the baud clock signal are to be separated by an extended time interval based to a second divisor component corresponding to said remainder which is longer than said minimum time interval; and
   a clock divider coupled to said first input and said divisor generator and responsive to said composite divisor for dividing said base clock signal to produce a baud clock signal which has a baud rate that approximates the desired baud rate and which has within each symbol interval thereof at least the minimum time interval between the leading edges of all adjacent pulses thereof and the extended time interval between the leading edges of at least one pair of adjacent pulses thereof.

11. The apparatus of claim 10, wherein the composite divisor includes a first divisor component indicative of the minimum time interval and a second divisor component which indicates that the leading edges of at least one pair of adjacent pulses are to be separated by the extended time interval.

12. An apparatus for generating a baud clock signal for use in a serial communication interface, comprising:
a first input for receiving a base clock signal having a predetermined frequency;
a second input for receiving information indicative of a desired baud rate;
a divisor generator coupled to said second input for providing in response to the desired baud rate a composite divisor which is indicative of a minimum time interval by which leading edges of adjacent pulses of the baud clock signal are to be separated and which further indicates that leading edges of at least one pair of adjacent pulses within each symbol interval of the baud clock signal are to be separated by an extended time interval which is longer than said minimum time interval; and
a clock divider coupled to said first input and said divisor generator and responsive to said composite divisor for dividing said base clock signal to produce a baud clock signal which has a baud rate that approximates the desired baud rate and which has within each symbol interval thereof at least the minimum time interval between the leading edges of all adjacent pulses thereof and the extended time interval between the leading edges of at least one pair of adjacent pulses thereof,
wherein the composite divisor includes a first divisor component indicative of the minimum time interval and a second divisor component which indicates that the leading edges of at least one pair of adjacent pulses are to be separated by the extended time interval, and
wherein said divisor generator includes a divider for dividing the predetermined frequency of the base clock signal by the desired baud rate and by an oversampling factor indicative of a number of baud clock pulses within each symbol interval of the baud clock signal to produce a quotient and a remainder, and wherein the quotient is the first divisor component and the remainder is the second divisor component.

13. The apparatus of claim 12, wherein the remainder is a modulo K remainder, and wherein K is the oversampling factor.

14. An apparatus for generating a baud clock signal for use in a serial communication interface, comprising:
a first input for receiving a base clock signal having a predetermined frequency;
a second input for receiving information indicative of a desired baud rate;
a divisor generator coupled to said second input for providing in response to the desired baud rate a composite divisor which is indicative of a minimum time interval by which leading edges of adjacent pulses of the baud clock signal are to be separated and which further indicates that leading edges of at least one pair of adjacent pulses within each symbol interval of the baud clock signal are to be separated by an extended time interval which is longer than said minimum time interval; and
a clock divider coupled to said first input and said divisor generator and responsive to said composite divisor for dividing said base clock signal to produce a baud clock signal which has a baud rate that approximates the desired baud rate and which has within each symbol interval thereof at least the minimum time interval between the leading edges of all adjacent pulses thereof and the extended time interval between the leading edges of at least one pair of adjacent pulses thereof,
wherein the composite divisor includes a first divisor component indicative of the minimum time interval and a second divisor component which indicates that the leading edges of at least one pair of adjacent pulses are to be separated by the extended time interval, and
wherein said divisor generator includes a look-up table having stored therein information indicative of a corresponding relationship between a plurality of baud rate ranges and respective pairs of said first and second divisor components.

15. An apparatus for generating a baud clock signal for use in a serial communication interface, comprising:
a first input for receiving a base clock signal having a predetermined frequency;
a second input for receiving information indicative of a desired baud rate;
a divisor generator coupled to said second input for providing in response to the desired baud rate a composite divisor which is indicative of a minimum time interval by which leading edges of adjacent pulses of the baud clock signal are to be separated and which further indicates that leading edges of at least one pair of adjacent pulses within each symbol interval of the baud clock signal are to be separated by an extended time interval which is longer than said minimum time interval; and
a clock divider coupled to said first input and said divisor generator and responsive to said composite divisor for dividing said base clock signal to produce a baud clock signal which has a baud rate that approximates the desired baud rate and which has within each symbol interval thereof at least the minimum time interval between the leading edges of all adjacent pulses thereof and the extended time interval between the leading edges of at least one pair of adjacent pulses thereof,
wherein the composite divisor includes a first divisor component indicative of the minimum time interval and a second divisor component which indicates that the leading edges of at least one pair of adjacent pulses are to be separated by the extended time interval, and
wherein said clock divider includes a base clock counter responsive to said base clock and said first divisor component for determining said minimum time interval and said extended time interval, a pulse generator coupled to said base clock counter for producing the baud clock signal in response to operation of said base clock counter, and a pulse position memory coupled to said base clock counter for storing information indicative of the at least one pair of adjacent pulses that are to be separated by the extended time interval.

16. The apparatus of claim 15, wherein said pulse position memory includes an input for receiving said second divisor component, said pulse position memory responsive to said second divisor component for selecting said information indicative of the at least one pair of adjacent pulses.

17. The apparatus of claim 16, wherein said pulse position memory includes a plurality of entries and is responsive to said second divisor component for selecting one of said entries, said clock divider including a baud clock counter coupled to said pulse generator for counting pulses of said baud clock signal, said baud clock counter having an output coupled to said pulse position memory, said pulse position memory responsive to said output of said baud clock counter for selecting a portion of said one entry.

18. The apparatus of claim 10, wherein the serial communication interface is a UART.

19. A data processing apparatus capable of serial communication with an external device, comprising:
   data processing circuitry for performing data processing operations on data involved in serial communication with the external device:
   a serial communication interface coupled to said data processing circuitry for permitting serial communication between said data processing circuitry and the external device; and
   a baud clock generator for generating a baud dock signal for use by the serial communication interface, said baud clock generator including a first input for receiving a base clock of the serial communication interface, said base clock having a predetermined frequency, a second input for receiving information indicative of a desired baud rate, a divisor generator coupled to said second input for providing in response to the desired baud rate a composite divisor to produce a quotient and remainder which is indicative of a minimum time interval based on a first divisor component corresponding to said quotient by which leading edges of adjacent pulses of the baud clock signal are to be separated and which further indicates that leading edges of at least one pair of adjacent pulses within each symbol interval of the baud clock signal are to be separated by an extended time interval based to a second divisor component corresponding to said remainder which is longer than said minimum time interval, and a clock divider coupled to said first input and said divisor generator and responsive to said composite divisor for dividing said base clock signal to produce a baud clock signal which has a baud rate that approximates the desired baud rate and which has within each symbol interval thereof at least the minimum time interval between the leading edges of all adjacent pulses thereof and the extended time interval between the leading edges of at least one pair of adjacent pulses thereof.

20. The apparatus of claim 19, wherein said serial communication interface is a UART.

21. The apparatus of claim 19, provided as one of a microprocessor, a digital signal processor, a modem, and a radiotelephone.

22. A data processing communication system, comprising:
   a data processing apparatus and a device coupled externally to the data processing apparatus via a serial communication path;
   said data processing apparatus including data processing circuitry for performing data processing operations on data involved in serial communication with said externally coupled device, a serial communication interface coupled between said data processing circuitry and said serial communication path for permitting serial communication between said data processing circuitry and the externally coupled device, and a baud clock generator for generating a baud clock signal for use by the serial communication interface; and
   said baud clock generator including a first input for receiving a base clock of the serial communication interface, said base clock signal having a predetermined frequency, a second input for receiving information indicative of desired baud rate, a divisor generator coupled to said second input for providing in response to the desired baud rate a composite divisor to produce a quotient and remainder which is indicative of a minimum time interval based on a first divisor component corresponding to said quotient by which leading edges of adjacent pulses of the baud clock signal are to be separated and which further indicates that leading edges of at least one pair of adjacent pulses within each symbol interval of the baud clock signal are to be separated by an extended time interval based to a second divisor component corresponding to said remainder which is longer than said minimum time interval, and a clock divider coupled to said first input and said divisor generator and responsive to said composite divisor for dividing said base clock signal to produce a baud clock signal which has a baud rate that approximates the desired baud rate and which has within each symbol interval thereof at least said minimum time interval between the leading edges of all adjacent pulses thereof and said extended time interval between the leading edges of at least one pair of adjacent pulses thereof.

23. The system of claim 22, wherein said data processing apparatus is one of a microprocessor, a digital signal processor, a modem, a radiotelephone and a central processing unit of a laptop or desktop computer.

24. The system of claim 23, wherein the externally coupled device is one of a microprocessor, a digital signal processor, a modem, a keyboard, a mouse, a printer and a laptop or desktop computer.

25. The system of claim 22, wherein the externally coupled device is one of a microprocessor, a digital signal processor, a modem, a keyboard, a mouse, a printer and a laptop or desktop computer.

26. A method of generating from a base clock signal having a predetermined frequency a baud clock signal for use in receiving incoming data in serial communications, comprising:
   receiving the incoming data at an unknown baud rate;
   in response to the incoming data, providing a composite divisor to produce a quotient and remainder which is indicative of a minimum time interval based on a first divisor component corresponding to said quotient by which leading edges of adjacent pulses of the baud clock signal are to be separated and which further indicates that leading edges of at least one pair of adjacent pulses within each symbol interval of the baud clock signal are to be separated by an extended time interval based to a second divisor component corresponding to said remainder which is longer than said minimum time interval; and
   dividing the base clock signal in response to said composite divisor to produce a baud clock signal which has the unknown baud rate and which has within each symbol interval thereof at least the minimum time interval between the leading edges of all adjacent pulses thereof and the extended time interval between the leading edges of at least one pair of adjacent pulses thereof.

27. The method of claim 26, wherein said providing step includes providing the composite divisor in response to a start bit of the incoming data.

28. An apparatus for generating a baud clock signal for use in receiving incoming data in a serial communication interface, comprising:

- a first input for receiving a base clock signal having a predetermined frequency;
- a second input for receiving the incoming data at an unknown baud rate;
- a divisor generator coupled to said second input for providing in response to the incoming data a composite divisor to produce a quotient and remainder which is indicative of a minimum time interval based on a first divisor component corresponding to said quotient by which leading edges of adjacent pulses of the baud clock signal are to be separated and which further indicates that leading edges of at least one pair of adjacent pulses within each symbol interval of the baud clock signal are to be separated by an extended time interval based to a second divisor component corresponding to said remainder which is longer than said minimum time interval; and
- a clock divider coupled to said first input and said divisor generator and responsive to said composite divisor for dividing said base clock signal to produce a baud clock signal which has the unknown baud rate and which has within each symbol interval thereof at least the minimum time interval between the leading edges of all adjacent pulses thereof and the extended time interval between the leading edges of at least one pair of adjacent pulses thereof.

* * * * *